United States Patent [19]
De Dobbelaere et al.

[11] Patent Number: 6,097,871
[45] Date of Patent: Aug. 1, 2000

[54] METHOD OF MAKING AN OPTICAL WAVEGUIDE TO FIBRE CONNECTOR USING A FREE-STANDING, FLEXIBLE WAVEGUIDE SHEET

[76] Inventors: Peter Martin Cyriel De Dobbelaere, Gelderse Plein 55, 6834 CB Arnhem, Netherlands; Peter Paul Van Daele, Ste Annalaan 170, 9300 Aalst, Belgium; Gustaaf Ronald Mohlmann, Copernicusstraat 10, 1704 SV, Heerhugowaard, Netherlands

[21] Appl. No.: 08/793,816
[22] PCT Filed: Aug. 16, 1995
[86] PCT No.: PCT/EP95/03245
  § 371 Date: Jul. 2, 1997
  § 102(e) Date: Jul. 2, 1997
[87] PCT Pub. No.: WO96/07116
  PCT Pub. Date: Mar. 7, 1996

[30] Foreign Application Priority Data

Aug. 26, 1994  [EP]  European Pat. Off. ............. 94202447

[51] Int. Cl.[7] ................. G02B 6/10; G02B 6/30
[52] U.S. Cl. ............ 385/129; 385/130; 385/132; 385/49
[58] Field of Search ............ 385/165, 129–132, 385/49

[56] References Cited

U.S. PATENT DOCUMENTS

| 4,240,849 | 12/1980 | Kurokawa et al. | 156/73.2 |
|---|---|---|---|
| 4,466,696 | 8/1984 | Carney | 350/96.2 |
| 4,496,215 | 1/1985 | Shaheen et al. | 350/96.23 |
| 4,795,664 | 1/1989 | DeMartino | 428/1 |
| 4,867,540 | 9/1989 | DeMartino | 350/355 |
| 4,896,930 | 1/1990 | Tsuchitani et al. | 350/96.12 |
| 4,966,433 | 10/1990 | Blonder | 350/96.17 |
| 4,985,528 | 1/1991 | Mignani et al. | 528/59 |
| 5,046,800 | 9/1991 | Blyler, Jr. et al. | 385/131 |
| 5,195,162 | 3/1993 | Sultan et al. | 385/130 |
| 5,268,981 | 12/1993 | Shahid | 385/71 |
| 5,375,184 | 12/1994 | Sullivan | 385/129 |
| 5,444,805 | 8/1995 | Mayer | 385/49 |
| 5,533,156 | 7/1996 | Maxwell et al. | 385/49 |
| 5,548,673 | 8/1996 | Kitamura et al. | 385/49 |
| 5,764,820 | 6/1998 | De Dobbelaere et al. | 385/14 |

FOREIGN PATENT DOCUMENTS

| 6960 | 7/1979 | European Pat. Off. | G06F 3/02 |
|---|---|---|---|
| 350112 | 1/1990 | European Pat. Off. | C08G 18/67 |
| 350113 | 1/1990 | European Pat. Off. | C08G 63/68 |
| 358476 | 3/1990 | European Pat. Off. | G03F 7/00 |
| 480477 | 4/1992 | European Pat. Off. | G02B 6/30 |
| 2205845 | 12/1988 | United Kingdom | C08F 38/00 |
| 93/18422 | 9/1993 | WIPO | G02B 6/30 |
| 94/15235 | 7/1994 | WIPO | G02B 6/42 |

OTHER PUBLICATIONS

Derwent Patent Abstract 91–052190/08 (1991) DE 3926–691–A.

(List continued on next page.)

Primary Examiner—Rodney Bovernick
Assistant Examiner—Juliana K. Kang
Attorney, Agent, or Firm—Lacasse & Associates; Randy W. Lacasse; Kevin E. Greene

[57]  ABSTRACT

An optical device is provided by a pigtailing method and comprises a substrate on which are integrated a layered optical waveguide component and optical fibre ends. The optical fibre ends are positioned in grooves). The method involves providing a substrate comprising grooves, notably V-shaped grooves, with a separately made optical waveguide component. The component is made on a separate flat substrate and released by virtue of a releasable layer present on the flat substrate. An advantageous releasable layer is made of a water-soluble salt. Flexible waveguide sheets such as can be used in the previously described method or, if provided with waveguide channels, as flexible waveguide components themselves are also disclosed.

4 Claims, 5 Drawing Sheets

OTHER PUBLICATIONS

Derwent Patent Abstract 92–327107/40 (1992) JP 04232906–A.
Derwent Patent Abstract 92–375882/46 (1992) JP 04274402–A.
Derwent Patent Abstract 93–380136/48 (1993) JP 05281428–A.
Patent Abstracts of Japan, vol. 17, No. 66, P–1484 Sep. (1993), Akira et al. JP4274402.
Derwent Patent Abstract 30730A/17 Mar. (1978), Takahashi.
Patent Abstracts of Japan, vol. 17, No. 78, P–1488 Oct. (1992), Hideichiro et al., JP4281406.
Patent Abstracts of Japan, vol. 17, No. 387, P–1576 Mar. (1993), Makoto et al. JP 5066435.
B.L. Booth, "Polymers for Integrated Optical Waveguides", Polymers for electronic and Photonic Applications, pp. 549–599 (1993).
B.L. Booth, "Low Loss Channel Waveguides in Polymers", Journal of Lightwave Technology, vol. 7, No. 10, Oct., 1989, pp. 1445–1453.
M.J. Wale et al., "Self–Aligned Flip–Chip Assembly of Photonic Devices with Electrical and Optical Connections", IEEE Transactions of Components, Hybrids, and Manufacturing Technology, vol. 13, No.4, Dec. 1990, pp. 780–786.
Derwent Patent Abstract 01161A/01 Nov. (1977).

METHOD OF MAKING AN OPTICAL WAVEGUIDE TO FIBRE CONNECTOR USING A FREE-STANDING, FLEXIBLE WAVEGUIDE SHEET

CROSS-REFERENCE TO RELATED APPLICATIONS

BACKGROUND OF THE INVENTION

1. Field of the Invention

The invention pertains to a method of making an optical device comprising a substrate on which are integrated a layered optical waveguide component comprising a polymeric guiding layer sandwiched between two deflection layers of a lower refractive index than the guiding layer, and optical fibre ends, the optical fibre ends being positioned in grooves.

2. Description of the Related Art

Optical fibre ends attached to the integrated optic device are usually referred to as "pigtails," and the process of providing a waveguide component with such pigtails is referred to as "pigtailing." The invention also pertains to the pigtailed optical waveguide devices so obtainable and to the free-standing, flexible waveguide sheets used in making them.

In general, flexible waveguides are known. e.g., JP 04/232906 discloses a flexible multilayer light guiding sheet suitable for use in signal transmission, e.g., with light splitting such as optical data linking for cars.

JP 05/281428 pertains to a flexible optical interconnection board comprising a flexible optical waveguide mounted onto a base plate that can have various shapes (e.g. curved).

From JP 04/274402 it is known to provide a flexible waveguide by coating a polyamic acid solution onto a substrate, irradiating it so as to produce a precured film, removing said film from the substrate, and curing it so as to form a polyimide waveguide. A polyimide film having a lower index of refraction than the polyimide waveguide film is used to coat at least part of an upper layer and a lower layer of the waveguide film.

It is known to produce polymeric flexible waveguides having a refractive index pattern, see JP 52/138 146 which teaches forming a polymeric film, diffusing a monomer in it, and polymerizing the monomer in selected areas. Comparable techniques have been disclosed in JP 78/026813 and JP 54/088144.

From U.S. Pat. No. 4,496,215 it is known to provide an optical interconnection device comprising straight and curved segments, in which the optical interconnection is in the form of fibres (laid in a layered flexible structure).

These references do not specifically address the problem of pigtailing polymeric optical waveguide components. This continues to be one of the principal challenges when making optical waveguide devices. Making a proper connection with a minimum loss of light (coupling loss) between the guiding layer of the waveguide component and the core of the optical fibre is a cumbersome, and generally expensive process step. This especially holds for coupling with single mode optical fibres.

It is known to make use of substrates (usually of silicon) having V-shaped grooves in which fibre ends can be placed. The V-shape of the grooves allows the fibres to be properly aligned vertically (i.e., in respect of the height of the guiding layer) as well as laterally (i.e., in respect of the width of waveguiding channels made in the guiding layer). After the fibres have been placed in the V-grooves they are usually fixed using glue, solder, or the like.

A method as indicated above, employing such a V-grooved substrate, is known from GB 2 000 877. The method disclosed bonding the end-portions of a plurality of optical fibres to V-shaped grooves provided on a transparent substrate by an adhesive; casting a polymer solution onto the fixed optical lead fibres-containing substrate, and evaporating the solvent. Thus, the optical lead fibres are embedded in a polymer layer. Said polymer layer, which serves as the guiding layer of the optical waveguide component, contains, int.al., a photopolymerizable monomer. By selectively activating this monomer, the refractive index of the guiding layer can be selectively decreased. Thus, waveguide channels can be formed in the guiding layer by irradiating the surrounding material. These channels can be made to be aligned with the positions of the embedded ends of the optical fibres. On the guiding layer a low refractive index coating is applied as a top deflection layer. The substrate serves as the lower deflection layer.

The method disclosed in GB 2 000 877 has several drawbacks. In part, these are associated with the use of the substrate as the lower deflection layer. One disadvantage thereof is that the disclosed method cannot be applied to make electro-optically active waveguides. E/O-active, or NLO materials, are known. In such materials non-linear charge polarization occurs under the influence of an external electric field. Non-linear electric polarization may give rise to several optically non-linear phenomena such as frequency doubling and Pockels effect. Obtaining the desired NLO effect in polymeric materials macroscopically requires that first the groups present in such a material, mostly hyperpolarizable side groups, be aligned (poled). Such poling is usually effected by exposing the polymeric material to electric (dc) voltage, the so-called poling field, with such heating as will render the polymeric chains sufficiently mobile for orientation. Hence, if a polable e/o material is used in the guiding layer, it is a requirement for poling to occur that the guiding layer can be exposed to an electric field. To this end, two electrodes are needed, one of which is usually applied on top of the layered waveguiding structure, while the other is usually applied at the bottom, i.e., in between the substrate and the lower deflection layer. Providing such a bottom electrode is not envisaged in the method of GB 2 000 877.

Another disadvantage of using the V-grooved substrate as the lower deflection layer is that the refractive index of such a lower deflection layer cannot be tailored to that of the guiding layer and the top deflection layer. Since the difference in refractive indices (the refractive index contrast) of the layers determines the efficiency with which light from an optical fibre can be coupled into the waveguide and viceversa, it is a serious design limitation if the refractive index of any one of the layers cannot be freely chosen. This particularly holds for the deflection layers, since, depending on the nature of the device, the requirements applicable to the guiding layer polymer frequently are more stringent than those applicable to the cladding layers. E.g., in the case of electro-optically active guiding layers, the choice of the guiding layer polymer will be determined more by its e/o coefficient than by other properties such as refractive index. Or, if it is desired to form channels in the guiding layer by means of "bleaching" (a photophysical change of refractive index such as disclosed in EP 358 476), the guiding layer polymer may be chosen for its bleaching capacity more than anything else.

The method of GB 2 000 877 cannot be simply replaced by a method in which a separate lower deflection layer is applied on the substrate. To begin with, this would undo the very fibre-waveguide alignment as taught in the disclosure. Further, if the lower deflection layer is polymeric, which is highly desirable in respect of tailoring the refractive index and compatibility with the polymeric guiding layer, the problem applies that the V-grooves will fill up with the deflection layer polymer, leading either to the fibre cores being severely misaligned with the light guiding channels of the polymeric waveguide or unflatness and thickness non-uniformity for the waveguide structure, or both.

Another known method for connecting optical fibres with waveguide devices employing V-grooved Si is known from *IEEE Transactions on Components, Hybrids, and Manufacturing Technology*, Vol.13(4), 1990, pages 780–786. The method involves bonding a first substrate, a portion of which carries optical fibres in V-grooves, with a second substrate carrying an integrated optical circuit, the fibres and the circuit eventually being positioned adjacent to each other. The two substrates face away from one another, and the bonding is achieved by means of solder bumps. This so-called flip-chip solder bump bonding is a self aligning process, the alignment being achieved through the action of surface tension forces during solder reflow. This method has several drawbacks in respect of pigtailing polymeric waveguide components. The required melting and flowing of solder generally requires temperatures that are too high to be used with polymers. A typical temperature being 200° C., this will be above the glass transition of many types of electro-optically active polymers, which will lead to these polymers losing their activity. Further, the flux (organic acid that prevents oxidation of the solder) that as a rule is dispensed on the solder during reflow, is likely to attack the polymer. Further the method has the drawback of the final product comprising no less than three different substrates: the two substrates mentioned, i.e., one carrying the integrated optical circuit and the other carrying the fibres in V-grooves, together need be supported by a third substrate, a so-called motherboard.

BRIEF SUMMARY OF THE INVENTION

The invention now seeks to provide a pigtailing method that can be used with passive as well as thermo-optically and electro-optically active waveguides, allows refractive index tailoring, and can be used with polymers. In providing such a method, it is an object of the invention to avoid the complicated use of three different substrates and to wind up with a device comprising a single substrate. To this end, the invention consists in that in a method as described in the opening paragraph, a substrate comprising grooves, notably V-shaped grooves, is provided with a separately made polymeric structure comprising one or more layers, hereinafter referred to as a freestanding sheet.

BRIEF DESCRIPTION OF THE SEVERAL VIEWS OF THE DRAWINGS

The invention is further illustrated with reference to the drawings. These drawings are presented for purposes of explanation only, and should not be considered limitative in any way.

FIG. 1 depicts a flat substrate (1) provided with a releasable layer (2), and a layered waveguide structure (3) comprising a lower deflection layer (4), a guiding layer (5), and a top deflection layer (6).

FIG. 2 shows how the layered waveguide structure (3) has been released from the original substrate (1), thus forming a free-standing waveguide sheet.

FIG. 3 depicts a grooved guest substrate (7) comprising a flat section (8) and a grooved section (9) with grooves (10).

Figure 1:
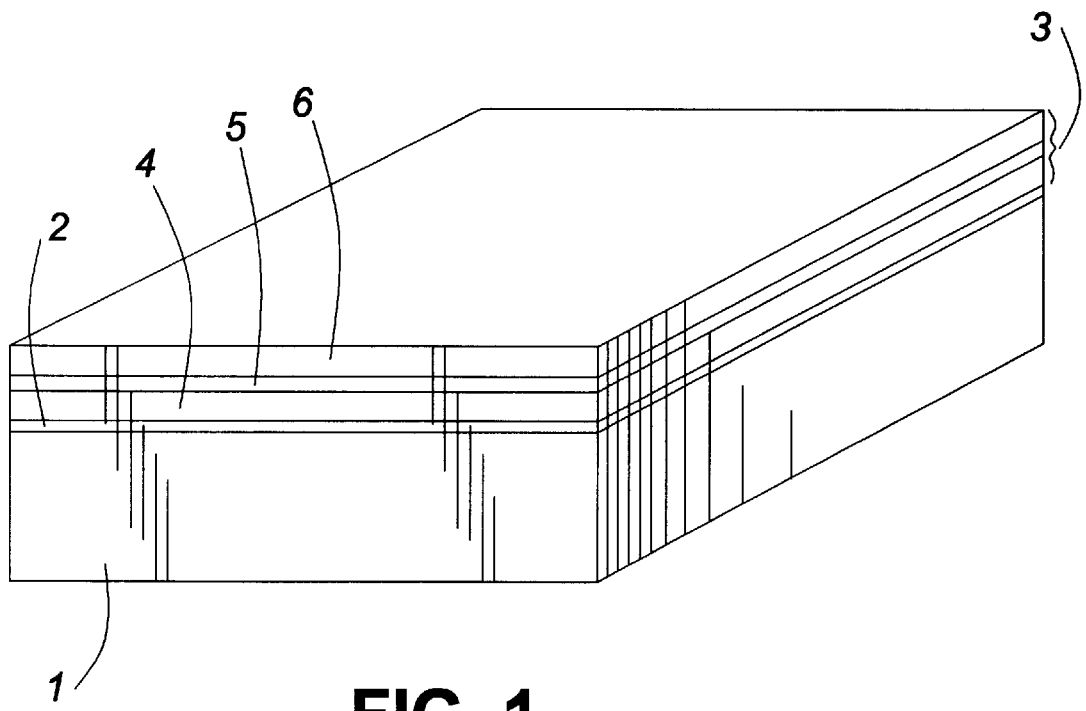
FIGS. 1–7 illustrate the pigtailing method of the present invention.
Figure 2:
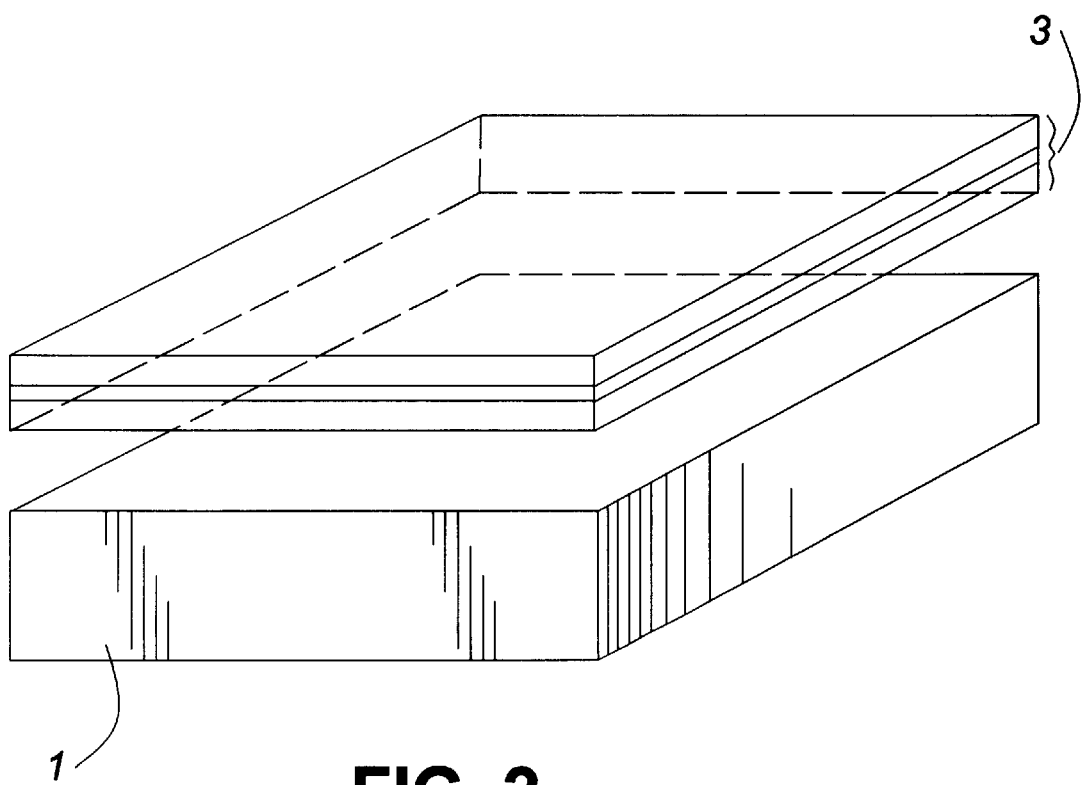
Figure 3:
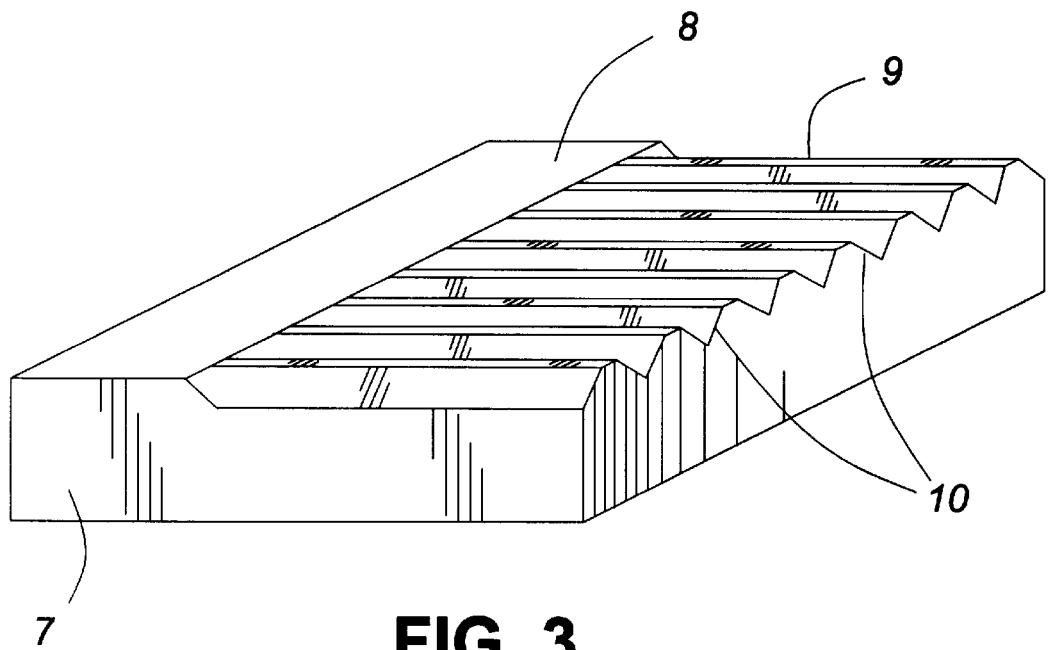
Figure 4:
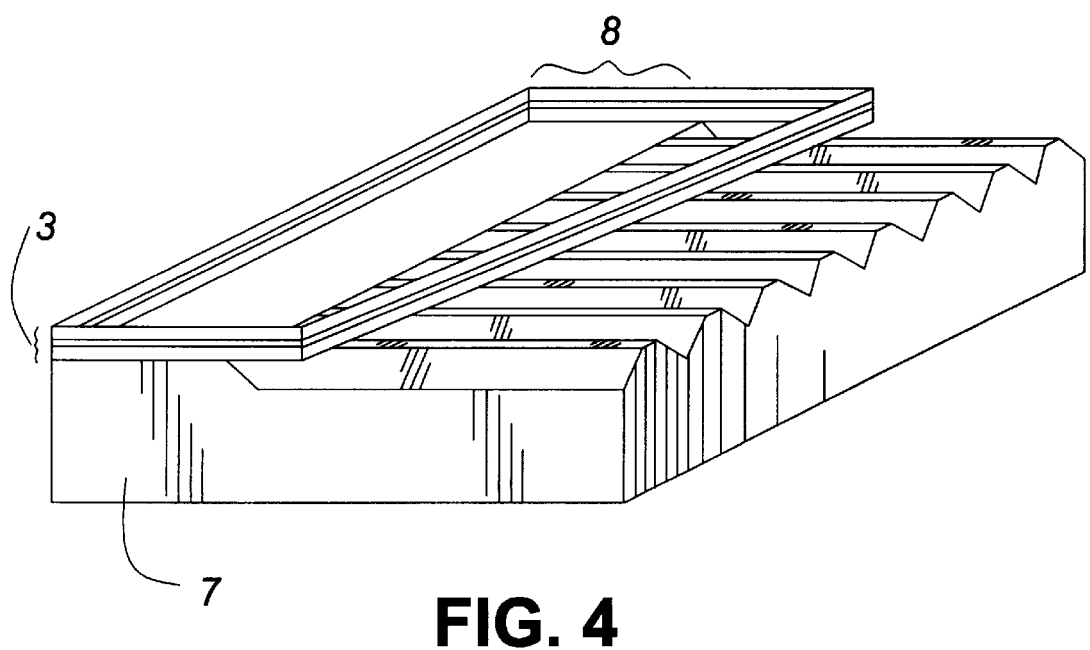

According to FIG. 4, the released waveguide (3) is applied on the grooved substrate (7), at least covering the flat section (8).

Figure 5:
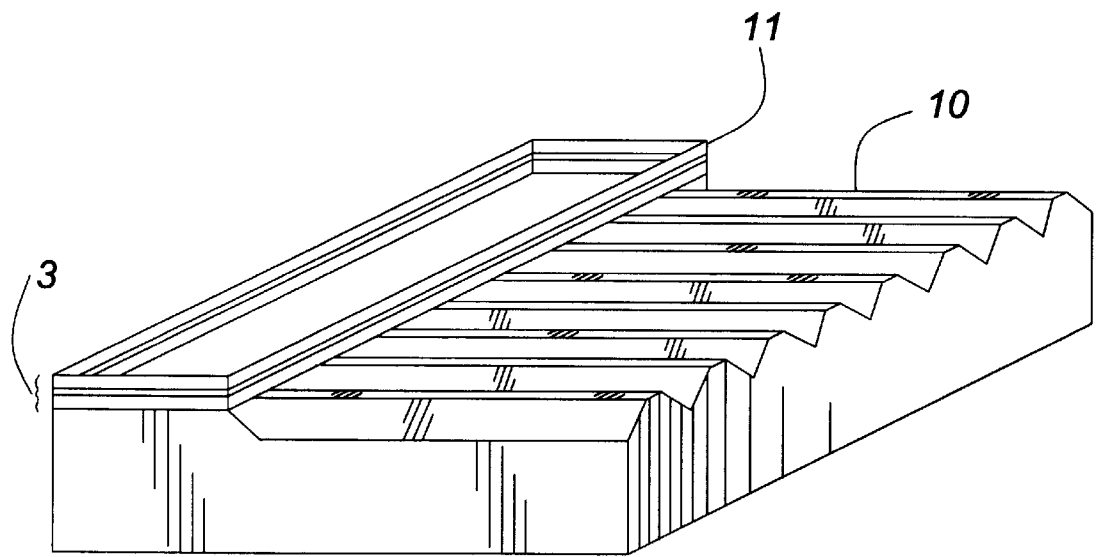

FIG. 5 shows that the waveguide (3) has been provided with an etched facet (11) adjacent to the grooves (10).

Figure 6:
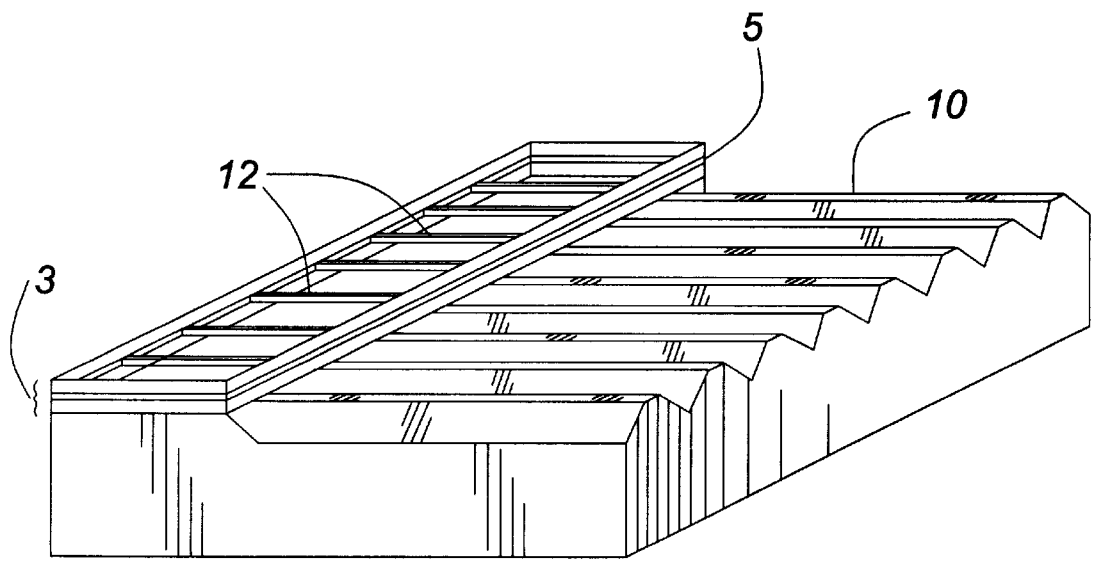

According to FIG. 6, waveguide channels (12) have been made in the waveguide (3) by bleaching the guiding layer (5). The channels (12) have been positioned so as to be aligned with the grooves (10).

Figure 7:
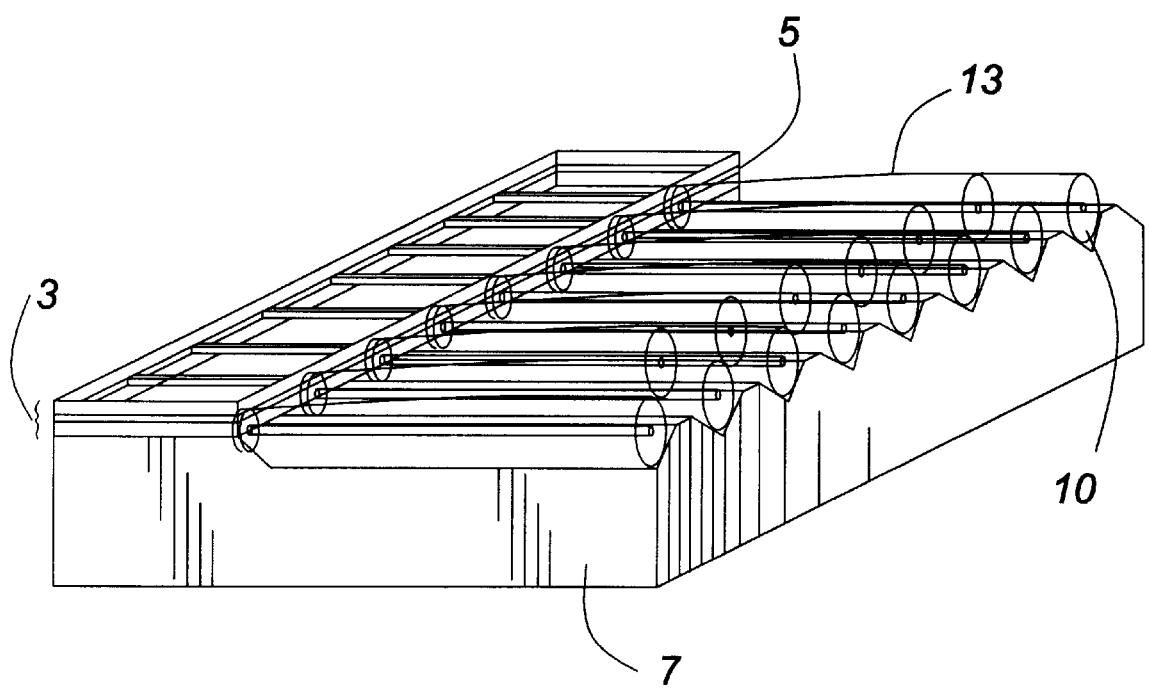

In FIG. 7 a device is depicted comprising a substrate (7) on which are integrated a layered optical waveguide component (3) and optical fibre ends (13), the optical fibre ends being positioned in grooves (10). The fibre ends (13) are connected to the facet (11) of the waveguide (3). They are in vertical alignment with the guiding layer (5) and laterally aligned with the channels (12) contained in the guiding layer (5).

Figure 8:
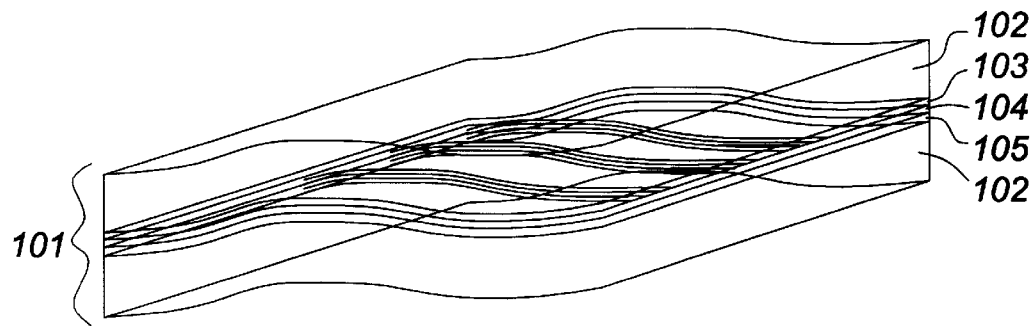
Figure 9:
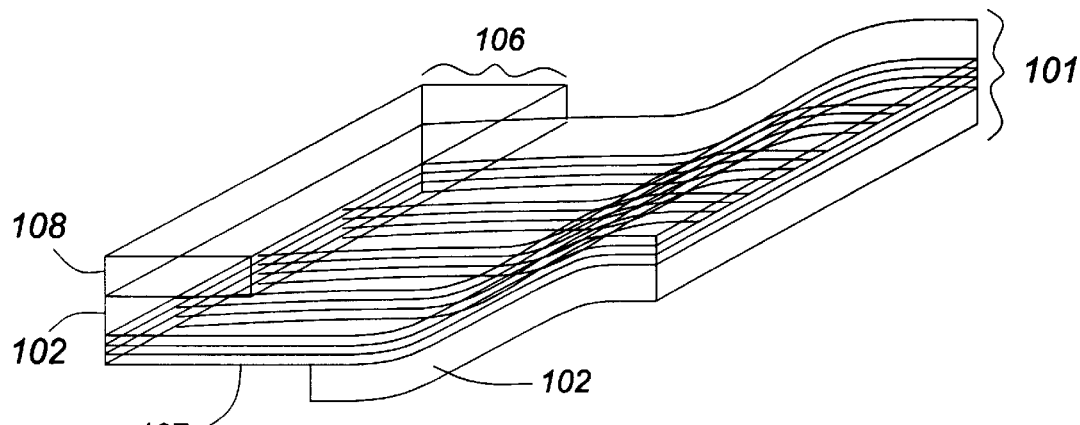
Figure 10:
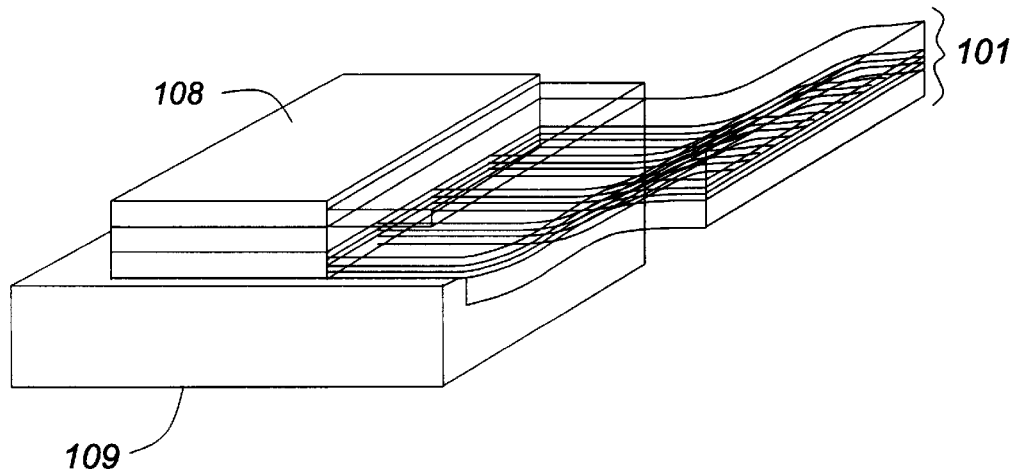

FIGS. 8–10 illustrate the interconnection of a flexible optical waveguide component according to the invention with an optical waveguide device.

In FIG. 8 is depicted a flexible waveguide component (101) comprising protective coating layers (102), deflection layers (103), and a guiding layer (104). The guiding layer (104) is provided with waveguide channels (105).

FIG. 9 shows how the flexible waveguide component (101) includes an interconnection section (106) which is devoid of the protective coating (102) on one side (107) and provided with a rigid cover (108) on the opposite side.

FIG. 10 depicts the connection of component (101) with an optical device (108) on a substrate (109).

DETAILED DESCRIPTION OF THE INVENTION

The free-standing sheet can either be a single layer, or it can be a layered structure comprising the guiding layer and at least one deflection layer, said layered structure being applied with the deflection layer facing the substrate. Preferably, the free-standing sheet is a complete layered waveguide structure comprising the guiding layer and two deflection layers enclosing the guiding layer.

In the case of the free-standing sheet being a single layer, it serves to planarize the V-grooved substrate. After this layer has been applied, other layers can be applied onto it, by means of spincoating, evaporation etc. The spincoating process, which is generally recognized to be the most convenient method for applying thin layers, such as in the case of polymeric optical waveguides, as a rule involves rapidly rotating the entire substrate to be coated. Hence, the further application of layers will necessarily involve covering the entire grooved substrate. The planarizing layer (which may serve as the lower deflection layer or may be an additional layer) is therefore applied over the entire grooved surface. After the other layers of the layered waveguide structure have been applied, a portion thereof will have to be removed (including the corresponding portion of the planarizing layer) so as to uncover the grooves. Such removal will generally have to be done by means of etching (e.g. $O_2$ reactive ion etching). The use of a single planarizing layer has as its main advantage that a polymeric layered waveguide structure can be applied onto a grooved substrate without the grooves filling up with polymer. Since the further spincoating steps are conventional, and allow the formation of a well-defined layered waveguide structure, proper alignment of fibres and waveguide may be attained. However, employing a free-standing sheet in the form of a complete layered waveguide structure has important additional advantages. This embodiment is less complicated, the waste of material is reduced to a minimum, and a smoother waveguide facet can be made. In all its embodiments, the invention allows obtaining an accurate connection of the waveguide with the optical fibres by adapting the layer thicknesses of the layered waveguide structure (and, if used, the planarizing layer) to the dimensions of the optical fibres (notably: core diameter). Thus, the cores of the optical fibres (usually cylindrical or elliptical) can be positioned face to face with the guiding layer of the layered waveguide structure.

The method of the invention involves separately providing a grooved substrate already containing fibre ends or not, and making a freestanding sheet.

The manner in which the grooved substrate is provided is not in itself part of the present invention. Instead, such substrates are commercially available or can be made by methods known to the man skilled in the art.

In principle, the substrate can be made of any material suitable for supporting a polymeric waveguide structure. Examples are thermoset polymers, in which the desired grooves can be made, e.g., by shaping techniques such as injection moulding, glass, or other inorganic materials such as silicon or GaAs and the like. In the latter materials, grooves can be made by etching techniques known from the semiconductor industry. In this respect silicon is particularly preferred. The grooves preferably are V-shaped, thus providing two facets in respect of which optical fibres can be very well kept in place, thus allowing positioning in respect of waveguide facets most accurately. The depth of the grooves logically depends on the diameter of the optical fibres employed.

If use is made of single mode fibres, which have a core diameter of about 9 $\mu$m, the substrate preferably is a monocrystalline material exhibiting an anisotropic etching characteristic, since high accuracy in the dimensions of the V-grooves which will contain the fibres having a diameter of the order of 125 micron must be obtained. In this respect silicon, gallium arsenide and indium phosphide are examples of suitable substrate materials.

If the free-standing sheet is not a mere planarizing layer, the grooved substrate can be provided with fibre ends before the freestanding sheet is applied. It is preferred to provide the fibre ends afterwards. In the case of an electro-optically active waveguide being formed, a bottom electrode in the form of a thin layer of metal is applied first, at least at the portion of the substrate that is to be covered with the free-standing sheet. This bottom metallization, preferably gold, is usually applied by evaporation or sputtering. Particularly in this embodiment, it is preferred if the substrate comprises two portions: a portion containing grooves (in which eventually the fibres will be laid) and a flat portion, on which first the metal layer and next the free-standing sheet is applied.

The free-standing sheet is prepared separately. In view of the required accuracy and thickness uniformity of the layers, or single layer, it is generally necessary to first make the free-standing sheet on a substrate. Such a substrate will be planar (flat), so that a layer, or layered structure, having clearly defined layer thicknesses can be made. After the layer or the layered structure has been lifted off the original substrate, it can be placed on the grooved substrate. The original substrate can be made of the above-mentioned substrate materials, silicon being preferred.

The polymeric materials from which the free-standing sheet, and eventually the layered waveguide are built up are not crucial to the present invention.

The deflection layers, as well as the guiding layer in the case of a passive optical component, can be made of any suitable polymer which is transparent to the wavelength employed and displays minimal optical losses for the desired wavelength. The most important wavelength ranges in actual practice are approx. 670 nm, from about 800 to about 1000 nm, approx. 1300 nm, and approx. 1500 nm. These last two wavelength ranges are especially suited for use in telecommunications. Of course, it is imperative that the guiding layer have a higher index of refraction than the deflection layers. The man skilled in the art will be aware of optical polymers that can be tuned to have the desired refractive index. Examples of suitable deflection (cladding) layer materials are acrylate-styrene copolymers, such as copolymers of hydroxyethyl methacrylate and styrene, and the same in conjunction with maleic anhydride. It may be advantageous to apply these polymers in the form of a prepolymer having functional end groups, and to include a polyfunctional cross-linking agent for these end groups (e.g. hydroxyl end groups to be cross-linked with Desmodur-N triisocyanate). The suitable polymeric materials for passive waveguides are known to the skilled person. Further, it is of importance for the core and deflection layers to be easy to treat and so processable as to give the flattest and purest possible contact surfaces between the core and deflection layers as well as sufficient adhesion between the core and deflection layers. The skilled person will know which materials to select to this end. Preferably, use is made of materials in which waveguide channels can be made by means of irradiation, as described below.

As indicated before, in electro-optically active waveguides use is made of polymers having a non-linear optical activity macroscopically effected therein by means of alignment. Suitable NLO-active materials (NLO polymers) have been described in EP 358 476 and in, e.g., EP 350 112, EP 350 113, EP 359 648, U.S. Pat. No. 4,867,540, U.S. Pat. No. 4,795,664, and WO 91/03001. For that matter, these materials are also suitable for use in passive waveguides.

Making the free-standing sheet in the form of a layered waveguide structure will generally involve the following steps:

Providing a flat substrate with a layer that is releasable upon proper treatment, e.g., a gold layer, or a layer of water-soluble material such as polyvinyl alcohol or water-soluble salt;

Applying the first deflection layer polymer on the releasable layer;

Applying the guiding layer polymer on the first deflection layer;

Applying the second deflection layer polymer on the guiding layer;

Releasing the layered structure from the flat substrate by suitably treating the releasable layer; in the case of a gold layer such treatment will involve subjection to warm KOH (appr. 50° C.)

In the case of the free-standing sheet comprising less than a full layered waveguide structure, the appropriate steps can be omitted. If the free-standing sheet is a separate planarizing that does not serve as the first deflection layer, the layer applied on the releasable layer can basically be any polymeric layer.

According to a particularly advantageous embodiment of the invention, the releasable layer comprises a water-soluble material such as a salt such as NaCl or polyvinyl alcohol.

This means that agressive treatment such as subjection to warm KOH can be avoided, and the waveguide sheet can be released from the original substrate by dipping the entire structure in water. It is then ready to be placed on the grooved substrate.

In some cases, particularly when the waveguide structure is so flexible as to give handling problems, an alternative to first releasing the waveguide sheet and then placing it on the grooved substrate is to perform these acts simultaneously. This can be done by placing the grooved substrate on top of the releasable waveguide structure still on the original substrate, and then activating the releasable layer. The grooved side of the substrate has to face the deflection layer. The original top deflection layer thus becomes the bottom deflection layer on the grooved substrate. Although this has been found to work without further measures, it may be advantageous to enhance the adhesion of the waveguide structure to the grooved substrate placed on top of it by first providing the grooved substrate with a thin adhesive layer. This can most conveniently be a layer of about 0.5 $\mu$m thickness of the same polymeric material as the deflection layer. Such a thin layer also covers the bottom of the grooves, but does not fill them up. Hence, the above-identified drawback that occurs when a full cladding layer (having a thickness of the order of 3–15 $\mu$m) is applied on the grooved substrate does not occur. Preferably, the adhesive layer is a still curable prepolymer, which is cured (by applying heat) after the structure has been released from the original substrate. In respect of thicknesses, it may be mentioned that the three-layered waveguide sheet will generally have a thickness of from about 5 to about 50 $\mu$m.

An advantage of first making a clearly defined structure of a polymeric guiding layer sandwiched in between two polymeric cladding layers is that the placing of the structure on the grooved substrate does not require high accuracy. For, this waveguide sheet can be applied on the grooved substrate with relatively low precision, and may cover an area extending beyond that on which the waveguide component eventually is desired. After the waveguide sheet has been so applied, and the channels are defined and a smooth facet is etched at the side at which the optical fibres will be positioned. All protruding parts can be removed using any appropriate etching technique, e.g., those known from the production of integrated circuits (ICs). Applicable in this case are wet-chemical etching techniques, e.g., with use being made of organic solvents or strong bases. However, preference is given to dry etching techniques, such as sputter etching, reactive ion etching, or reactive plasma etching. Such techniques are known to the skilled person and require no further elucidation here. Alternatively, there may be etching using a laser, mechanical etching such as grinding, cutting, drilling, or etching through bombardment with sanding particles such as alumina, silica, and, more particularly, pumice. The skilled person is expected to be able to select an appropriate etchant without undue experimentation. Preferably, use is made of reactive ion etching (RIE) or a combination of RIE and reactive plasma etching, while so-called laser ablation is another very suitable technique. To make the facet, and to remove the protruding portions of the layered polymeric structure, a mask is applied to cover those parts which should remain free from attack by the etchant. These masks, the chief prerequisite of which is that they be resistant to the action of the etchant, are known, int. al., from IC technology. Such a mask may be preformed and made up of, e.g., metal or synthetic material; alternatively, it can be made by applying a photosensitive resin (photoresist) and subsequently exposing and developing said resin in accordance with the desired pattern.

If an air gap between the optical fibres and the waveguide cannot be avoided simply by accurate positioning of the fibres and the waveguide, a filler, preferably low viscous, may be used to fill the gap. In this way, providing the optical properties of the filler do not differ markedly from those of the polymer, an inconvenient refractive index contrast in relation to an air gap may be avoided. Preferably the filler selected has the same, or virtually the same, refractive index as the core layer of the polymeric waveguide. Thus the polymer itself can very well be used as a filler, either in the form of a solution or (in the case of a thermoset) in the uncured state. Alternatively, use may be made of oligomers analogous to the polymer, a glue, or some other adhesive. Suitable adhesives are for instance the glues of the well-known epoxy or cyanoacrylate types.

In the case of an electro-optically active waveguide being prepared, the preferred method of the invention involves applying a first electrode in the form of a metal layer (preferably gold) on the salt layer, applying the first deflection layer, the guiding layer, and the second deflection layer, and then applying a second electrode in the form of a metal layer on the second deflection layer. Now the waveguide structure can be poled before it is released, by applying a suitable voltage to the two electrodes. Thereafter, the poled layered waveguide structure is released from the flat substrate, and applied on a guest substrate.

Usually, it will be necessary to define waveguide channels (i.e., lateral wave confinements) in the guiding layer. Methods of achieving this are known. For instance, such patterns may be provided by removing portions of the layered waveguide structure, e.g., by means of wet-chemical or dry etching techniques, and filling the formed voids with a material having a lower index of refraction (thus forming a wave confinement in the form of a channel made up of material enclosed on all sides by deflection layer material).

Alternatively, it is possible to use photosensitive material, which can be developed after irradiation; for instance, a negative photoresist, that is to say, material which is resistant to a particular solvent (developer) after being irradiated. The developer in that case may be used to remove non-irradiated material. However, it is preferred to employ a positive photoresist and have the developer remove the portion that has been irradiated.

The preferred technique, however, involves making use of a core material in which a waveguide pattern can be provided without any material being removed by etching. For instance, there is core material which is chemically converted into a material with a different index of refraction under the influence of heat, light or UV irradiation. If this concerns an increase in the index of refraction, the treated material will be used as core material. This may take the form of carrying out the treatment using a mask, with the holes in the mask being identical with the desired waveguide pattern. If, on the other hand, a reduction of the index of refraction is involved, the treated material will be suited for use as deflection material. The treatment in question in that case may be carried out using a mask of which the closed portions are identical with the desired waveguide pattern. See, e.g., the aforementioned GB 2 000 877.

In the process according to the present invention it is preferred to employ a flat waveguide of which the core layer comprises a polymer bleachable under the influence of irradiation. This is a particular type of light- or UV-sensitive core layer material. Probably because of a chemical rearrangement reaction, irradiation, preferably generally using blue light, lowers the index of refraction of such a material without affecting the remaining physical and mechanical properties. Preferably, the flat waveguide is provided with a mask covering the desired pattern of channels, so that the surrounding material can have its index of refraction lowered ("be bleached") by means of irradiation. Thus, as desired, waveguide channels are formed which are enclosed on all sides by material having a lower index of refraction (the bottom and top deflection layers and the surrounding bleached core layer material). Such bleachable polymers have been described, int.al., in EP 358 476.

In the method of the present invention, it is particularly advantageous to use the same mask material first for etching the facet and removing protruding portions of the layered waveguide structure, and next for irradiating to form the desired waveguide channels. Thus, after transplanting the waveguide sheet from the original substrate to the grooved guest substrate, e.g. a gold layer can be applied on the entire waveguide structure. Then, using a conventional gold etchant such as $KI/I_2$, the gold is removed by etching exactly along the boundaries of the grooved substrate (thus leaving open the protruding portions of the transplanted waveguide) and at the position of the desired waveguide facet. Defining which gold is to be removed by etching and which gold is to be kept can be conveniently done by means of a photoresist mask. All the redundant, protruding, layered waveguide material devoid of the gold layer is then removed by etching. thus leaving a grooved substrate a portion of which is provided with a layered waveguide structure having a smooth facet, the layered waveguide structure still being covered with a layer of gold. This same layer of gold can then be partially removed by etching, again employing a photomask and again using $KI/I_2$, so as to define a pattern of areas that should be bleached. Since only a portion of the substrate is covered with the waveguide structure, the grooves lie free, and are visible, on the other portion (adjacent to the etched facet). The visibility of the grooves enables accurate positioning of the desired waveguide channels, i.e., lateral alignment with the grooves (hence with the optical fibres). Accurate positioning can also be obtained by aligning corresponding alignment marks on both the grooved substrate and the mask for waveguide channel definition. It is also possible to have facets at either end of the waveguide structure, and to have a free portion of the grooved substrate adjacent to each facet.

Alternatively, the waveguide sheets can be provided with lateral wave confinements (channels) prior to their transplantation from the original, flat substrate to the grooved guest substrate. Of course, this will not be as advantageous in respect of alignment with the optical fibers, but the resulting free-standing waveguide sheets may very well be applied in somewhat different manner, viz. as a flexible optical waveguide component. I.e., the free-standing sheet is not transplanted to a guest substrate, but used as is, thus making favourable use of the free-standing waveeguide sheet's property of flexibility.

Thus, the invention also pertains to an optical waveguide component having a layered structure comprising a polymeric guiding layer sandwiched between two deflection layers of a lower refractive index than the guiding layer, with the guiding layer having been provided with lateral wave confinements, wherein the layered structure is pliable and not fixed on a rigid substrate. Such flexible waveguide components, which are basically the same as the waveguide sheets used in the above-described pigtailing method, and manufactured in the same manner but provided with waveguide channels, can be advantageously applied as a flexible optical interconnect (the optical counterpart of the well-known flexible printed circuit board). E.g., the flexible waveguide components allow making an interconnection between two or more optical devices or boards, while passing over and under other optical or electronic structures that may be present in between such devices or boards. As compared to the known fibre-ribbons, which find similar usage, the present flexible polymeric optical waveguide components have the advantage of allowing a much higher interconnection density and easier alignment of the waveguide array. The loss induced by bending the waveguides over radii of curvature of a few mm (say, about 2–10 mm) is negligible. It is also envisaged to make a coiled up flexible waveguide. As background literature on such flexible optical waveguide components are mentioned the publications of Bruce L. Booth in *Polymers for electronic and photonic applications*, ed. C. P. Wong, Academic Press, San Diego 1993, pages 549–599, and in *Journal of Lightwave Technology*, Vol.7, No.10, October 1989, pages 1445–1453.

In a particularly advantageous embodiment, it is possible to look through the flexible polymeric layered waveguide structure can be viewed through with light (visible or infrared) microscopy. In this embodiment, the waveguide channels can be precisely aligned with patterns on a substrate on which fibre ends, detectors, or light sources are accurately mounted in respect of these patterns. Most of the polymers used for guiding light are transparent within a range of from 530 nm (yellow) to 1700 nm (infrared).

The end portions of the flexible waveguide component will usually be provided with rigid covers (e.g., by covering both deflection layers with a thin glass plate at both ends of the component). A typical thickness for such a glass plate is 400 mm, a typical length is 1–5 mm.

Preferably, the flexible waveguide component comprises, on both surfaces, a protective coating layer. I.e., the layered waveguide structure is sandwiched between protective coating layers. The abovementioned rigid covers can then be applied over this protective coating. The protective coating preferably is an additional, relatively thick polymer layer (typically from about 50 to about 500 μm, preferably about 200–300 μm) fixed on the waveguide structure by means of an adhesive layer. The protective coating can be applied in the form of conventional, transparent, adhesive tape. It is particularly preferred for such a flexible optical waveguide component to comprise an interconnection section (i.e. the end or ends of the component at which a coupling with optical fibres has to be made) which is devoid of one of the layers of protective coating. The length of such an interconnection section will generally be as above, i.e., about 1–5 mm. At the end of the interconnection section a smooth facet is fabricated to allow the coupling in and coupling out of light. This facet can be fabricated by the previously described etching techniques, by polishing techniques, or by a knife-cut (microtoming). An interconnection section of this type has the considerable advantage of making it possible to accurately align the flexible waveguide to optical fibers. This alignment is still further improved if the interconnection section is provided with a rigid cover, such as a thin glass plate, on the side facing away from the side devoid of the protective coating. Thus, the interconnection section permits easy handling and basically can be moved in lateral, vertical, and longitudinal direction in respect of the optical waveguide components (such as optical fibres, laser diodes, detectors, waveguides) to which coupling should occur.

What is claimed is:

1. A method of making an optical device comprising a substrate on which are integrated a layered optical waveguide structure comprising a polymeric core layer sandwiched between two deflection layers of a lower refractive index than the core layer, and optical fibre ends, the optical fibre ends being positioned in grooves, the method comprising the following steps:

provessing a flat substrate with a layer that on releasable upon proper treatment;

applying a first polymeric deflection layer on the releasable layer;

applying a core layer polymer on the first polymeric deflection layer;

applying a second polymeric deflection layer on the core layer;

treating the releasable layer in such a way as to release the layered waveguide structure from the flat substrate;

placing the released layered waveguide structure on the substrate comprising grooves;

providing the layered waveguide structure with a facet adjacent to the grooves;

providing waveguide channels in the layered waveguide structure by suitably irradiating the care layer, the channels being positioned so as to be aligned with the grooves; and placing fibre-ends in the grooves.

2. A method according to claim 1 wherein the grooved substrate comprises a flat section and a grooved section, the layered waveguide structure being placed on the substrate so as to cover the flat section.

3. A method according to any one of claims 1 or 2 wherein the releasable layer comprises a water-soluble material, the releasing treatment comprising subjecting the stack of substrate, releasable layer, and layered waveguide structure to contact with water.

4. A method according to any one of claims 1 or 2 wherein the core layer polymer is a non-linear optic polymer, said polymer being poled before the layered waveguide structure is released from the substrate.

* * * * *

UNITED STATES PATENT AND TRADEMARK OFFICE
CERTIFICATE OF CORRECTION

PATENT NO. : 6,097,871
DATED : August 1, 2000
INVENTOR(S) : De Dobbelaere et al.

It is certified that error appears in the above-identified patent and that said Letters Patent is hereby corrected as shown below:

column 11, line 5, "that on releasable" should read --that is releasable--;

column 12, line 2, "care layer" should read --core layer--.

Signed and Sealed this

Twenty-fourth Day of April, 2001

Attest:

NICHOLAS P. GODICI

*Attesting Officer*  *Acting Director of the United States Patent and Trademark Office*